B. C. KNUDSEN.
INTAKE MANIFOLD TUBE FOR INTERNAL COMBUSTION MOTORS.
APPLICATION FILED APR. 1, 1913.
1,199,573.
Patented Sept. 26, 1916.
2 SHEETS—SHEET 1.
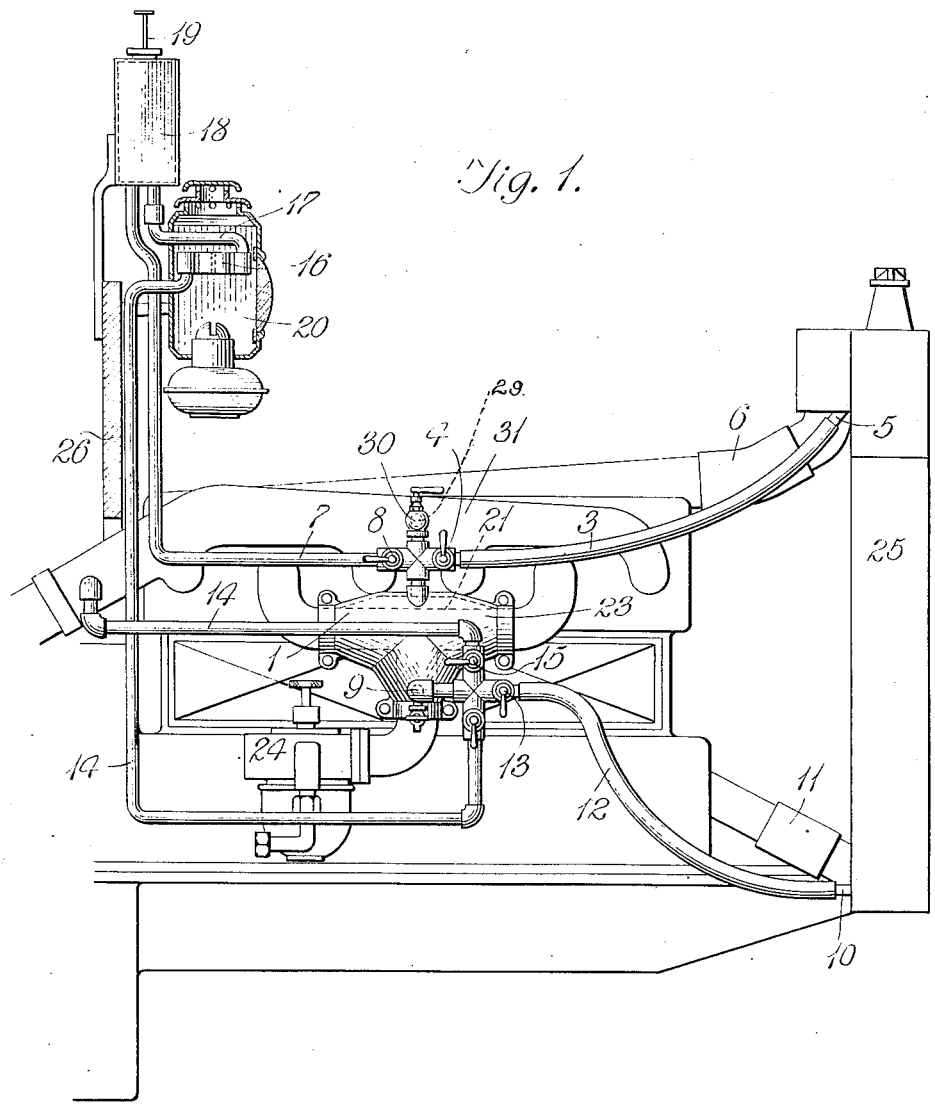
Fig. 1.
Witnesses
Inventor
Becker Chr. Knudsen,
Attorneys

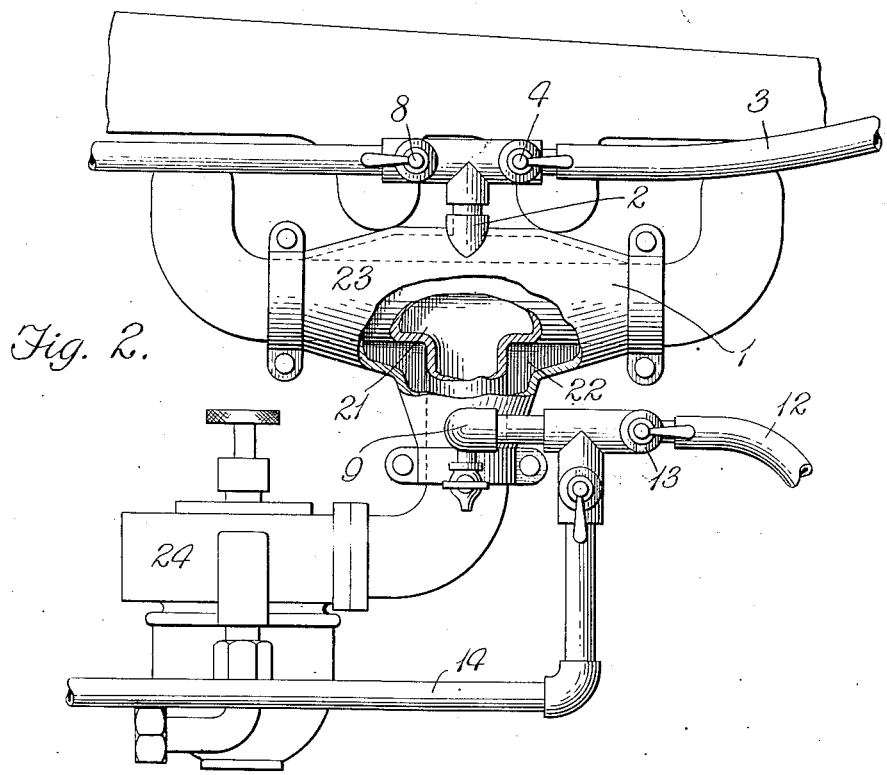

UNITED STATES PATENT OFFICE.

BECKER CHR. KNUDSEN, OF CLINTON, IOWA.

INTAKE-MANIFOLD TUBE FOR INTERNAL-COMBUSTION MOTORS.

1,199,573.  Specification of Letters Patent.  Patented Sept. 26, 1916.

Application filed April 1, 1913. Serial No. 758,272.

*To all whom it may concern:*

Be it known that I, BECKER C. KNUDSEN, a resident of 516 Melrose Court, in the city of Clinton, in the county of Clinton and State of Iowa, a citizen of the United States, have invented a new and useful Intake-Manifold Tube for Internal-Combustion Motors, of which the following is the specification.

My invention relates to internal combustion motors in which a gas and air mixture, produced in a carbureter, is drawn by suction through a tube called, an intake manifold, into the cylinders of the motor. In cold weather a diminution of power of the motor is often experienced by reason of condensation of the gas and air mixture while passing through a cold manifold intake tube. My invention does away with the aforesaid loss of power of the motor and in fact increases the power and economical operation of an internal combustion motor at all times by means of a jacketed manifold intake tube through the spaces of which circulates hot water or exhausted gas during the time the engine is running, thereby facilitating the perfect vaporization of the gasolene or another vapor used for the production of power in said internal combustion motor. During the time the motor is not in operation the liquid in the water jacket may be kept warm by means of an auxiliary heating apparatus, in cases where hot liquid is used for heating the manifold. The tubes connecting the said manifold circulation to the general cooling circulation are then shut off by means of a stop cock in each of said tubes and stop cocks in two other tubes similarly connected to the water jacketed manifold are opened. This opens up a circulation which passes through a heating lamp or apparatus situated on the dash board or other suitable place, the water is heated in said heater and caused to rise to a reservoir wherefrom it again returns to the water jacketed manifold. The circulation continues as long as heat is applied in the heater and the manifold tube is kept warm ready to facilitate the starting of the motor. This is especially useful in the case of automobiles. In the case a heavier fuel oil is used than gasolene it becomes necessary to superheat the air and gas mixture in order to have perfect combustion. To accomplish this object the exhaust in escaping from the cylinders is allowed to enter the spaces in the jacketing of the manifold to produce the heat necessary to vaporize the kerosene or other fuel used and thus facilitate combustion in the cylinders. The change from water circulation to exhaust heating is quickly accomplished by closing the four stop cocks 4, 8, 13, 15 opening the valves 30 and 35 draining the water out of the manifold jacket by opening drain cock 38.

The general construction and method of operation of my invention is shown in the accompanying drawings in which—

Figure 1 represents the apparatus complete *in situ* on the engine of an automobile known as a "Ford Model T." Fig. 2 shows the jacketed manifold intake tube; a portion of the wall is shown cut away to display the covered portion of the intake tube proper and also the spaces surrounding the same, through which spaces the heating medium circulates when in use. Fig. 3 shows a T-shaped hose connection used to connect the engine with the radiator circulation. By means of this T-shaped connection the manifold circulation may be connected, without making special provision in the construction of the radiator, when water heating is used in the manifold.

Fig. 1 represents the entire manifold circulating system in which 1 represents the water jacketed manifold or intake tube. It is shown in its place ready for work on the engine. The dotted lines on the manifold indicate the portion of the manifold or intake tube covered by the jacket or covering allowing water or other heating medium to fill the space between the tube and the jacket. The shape and extent of the jacket covering will of necessity be made to vary in conformity to the particular design of the motor on which it is used. Said jacket or outer covering may be constructed on any manifold where found practicable by inclosing a portion of the manifold to provide an air tight compartment and making the necessary connection as described. 2 represents an inlet through which the heating medium enters. It is connected by tubing 3, to the general circulation employed when hot water is used as the heating medium from said circulation. It may be shut off by a stop cock 4. Said tube is connected to the radiator by means of a nipple 5, soldered into said radiator, or may be connected to the rubber hose connection 6 by substituting the T shaped rubber hose connection shown in Fig. 3. Connection may also be made by tapping directly into the water space in the motor or other convenient situation. Inlet 2 also affords connection to a tube 7 leading to the reservoir in the auxiliary heating system, from which, circulation it may be disconnected by means of a stop cock 8. 9 represents an outlet for the heating medium from the space surrounding the manifold or intake tube 1. Said outlet 9 affords connection to a tube 12 connecting to the general circulation of the motor by means of a nipple 10 soldered into the lower part of the radiator or by connecting to the hose connection 11 by using the T shaped hose connection shown in Fig. 3. The circulation through tube 12 may be shut off by means of a stop cock 13. Outlet 9 also affords attachment to a tube 14 which leads to the auxiliary heating lamp or heating apparatus 20. The circulation through said tube 14 may be shut off by means of a stop cock 15. Tube 14 is attached to a water coil or small reservoir 16 placed adjacent to the flame in the heater 20. From said heating reservoir a metallic tube 17 leads to a reservoir 18 supplied with a float and indicator 19. Reservoir 18 is connected to the space in the jacket of the manifold by means of tube 7, thus completing the circuit through which the water circulates when the auxiliary heater is in operation provided the stop cocks are properly set, and the liquid reaches a level in the reservoir 18. 25 represents the radiator. 26 represents the dash board of the automobile.

Fig. 2 represents the jacketed manifold or intake tube for an internal combustion motor. This particular type is of a shape suitable for the motor used on a so called "Ford" automobile. It is shown with a portion of the front wall removed. 21 represents a portion of the manifold surrounded by the jacket space 22 and covering 23 forming the jacket. 24 represents a carbureter which has nothing to do with my invention.

Fig. 3 represents a T shaped rubber hose connection used for connecting the radiator to the engine water circulation. The small arm of the T affords attachment to a tube which connects with the jacket space in the manifold. A similarly designed T shaped hose connection is used both at the upper and lower connections.

In Fig. 1 is shown a valve 30 situated in a tube 29 which is fastened into an aperture leading into the exhaust manifold 31 establishing communication between said manifold 31 and the space formed by jacketing of the intake manifold 1. When this valve or stop cock 30 is open and the space in the manifold jacket is free from liquid, the hot exhaust gas will enter said space formed by said jacket of said manifold and heat the same when the motor is in operation. In order to allow more free entrance and exit of hot exhaust gas, communication is established between the outlet 9 and the exhaust manifold near the distal end of said manifold, by means of a tube which is supplied with a stop cock. Said stop cock serves to open or close said communication through said tube, in accordance with which medium of circulation is desired in said jacket of said manifold.

I am aware that manifold tubes have been constructed in the casting of the engine proper, and these have been designed so as to be surrounded or partly surrounded by water, and I am also aware that carbureters have been made with spaces through which water or exhaust gas is made to circulate so I do not claim jacketing for the purpose of heating the channel through which air and gas mixture is taken into the cylinders of an internal combustion motor, broadly, but

I claim as my invention:

1. The combination with a jacketed internal combustion engine and a manifold tube having branches, and a radiator, of a jacket inclosing a portion of said tube and the branches thereof and providing an inclosed compartment, means establishing a communication between said manifold jacket and said engine jacket, a hot water heating apparatus in communication with the compartment of said manifold jacket, and means establishing communication between the compartment of said manifold jacket and said radiator whereby water is circulated through the compartment of said jacket.

2. The combination with a jacketed internal combustion engine having a carbureter, manifold tube, and a radiator, of a jacket carried by said manifold tube and providing an inclosed compartment located at a point removed from the carbureter, a reservoir located at a point removed from said manifold jacket and in communication with the compartment of said jacket, a heating apparatus interposed between said reservoir and said jacket, and means for establishing communication between the compartment of said jacket and said radiator.

3. The combination with a manifold tube of an internal combustion engine and the branches of said tube, of a jacket surrounding said tube and branches thereof and providing an inclosed compartment, a pipe establishing communication between the compartment of said jacket and the central portion of the exhaust pipe of said engine adjacent to the jacket of the manifold tube, a pipe connecting the lower part of the compartment of said jacket with said exhaust pipe at a point removed from the engine, whereby the exhaust passes through the compartment of said jacket for heating the walls of said tube, and means for heating the walls of said tube independent of the exhaust.

4. The combination with the manifold tube of an internal combustion engine, and an air cooled radiator, of a jacket carried by said manifold tube and providing an inclosed compartment, means establishing communication between the compartment of said tube and the top and bottom of said radiator, a hot water reservoir in communication with the compartment of said jacket, a heating apparatus interposed between said reservoir and said jacket and having connection with said reservoir and said jacket, and means adapted to direct a water circulation through the inclosed compartment of said jacket.

5. The combination with a carbureter, an intake manifold tube of an internal combustion engine and the branches of said tube, and a radiator, of a jacket carried by said manifold tube and the branches thereof and providing an inclosed compartment at a point removed from said carbureter and in communication with said radiator, a reservoir in communication with said radiator and the inclosed compartment of said jacket, and a heating apparatus embodying a coil connected to said reservoir and in communication with said jacket.

6. The combination with the intake manifold tube of the engine of an automobile, a radiator, and a dash board, of a jacket forming part of said tube and adapted to have hot water circulated therethrough from said radiator, and means carried by said dash board for heating water adapted to be circulated through said jacket independently of said radiator whereby the walls of said tube can be heated during a cessation in the operation of said engine.

7. The combination with the intake manifold of the engine of an automobile, a radiator in communication with the water jacket of said engine, and a dash board, of a jacket forming part of said manifold and adapted to have hot water circulated therethrough from said radiator and the water jacket of said engine, and means carried by said dash board for heating water adapted to be circulated through said jacket and its connections with said radiator and said engine for heating the water used in connection with said engine during a cessation in the operation thereof.

8. In combination with a jacketed internal combustion engine having a jacketed intake manifold, a radiator, and a circulation system establishing communication between said radiator and said engine jacket; an independent circulating system comprising a source of circulating medium; means establishing communication between said source of circulating medium and said manifold jacket; and means establishing communication between said manifold jacket and said radiator.

9. In combination with a jacketed internal combustion engine having a jacketed intake manifold, a radiator, and a circulation system establishing communication between said radiator and said engine jacket; an independent circulating system comprising a source of circulating medium; means establishing communication between said source of circulating medium and said manifold jacket; means establishing communication between said manifold jacket and said radiator; and a heating instrumentality disposed between said source of circulating medium and said manifold jacket in the communicating means therebetween.

10. In combination with a jacketed internal combustion engine having a jacketed intake manifold, a radiator, and a circulation system establishing communication between said radiator and said engine jacket; an independent circulating system comprising a source of circulating medium; means establishing communication between said source of circulating medium and said manifold jacket; means establishing communication between said manifold jacket and said radiator; and means for cutting off communication between said source of circulating medium and said radiator.

11. The combination of a jacketed internal combustion engine having an exhaust manifold, a jacketed intake manifold, a radiator, a circulation system connecting said radiator and said engine jacket; a liquid tank; a system of piping connecting said liquid tank and said manifold jacket; a system of piping connecting said jacket and said exhaust manifold; a system of piping connecting said radiator and said jacketed manifold; means for establishing communication between said liquid tank and said radiator; and means for establishing communication between said jacketed manifold and said exhaust manifold.

12. In combination with a jacketed internal combustion engine having a jacketed intake manifold, an exhaust manifold, a radiator, and a circulation system connecting said radiator and said engine jacket; an independent circulating system comprising a liquid tank; a pipe connecting said liquid tank and said manifold jacket; a pipe connecting said radiator and said manifold jacket; valves disposed in said pipes; a connection between said exhaust manifold and said intake manifold jacket; a pipe connecting said radiator with said manifold jacket; a valve disposed in said pipe; a pipe connecting said manifold jacket and said exhaust manifold; a valve disposed in said pipe, a pipe connected to said manifold jacket and carried back to said liquid tank; a valve disposed in said pipe; and a source of heat associated with said pipe between said liquid tank and said exhaust manifold.

In testimony whereof I affix my signature in presence of two witnesses.

BECKER CHR. KNUDSEN.

Witnesses:
J. A. RAHSE,
P. J. THOM.